United States Patent
Brooks et al.

(10) Patent No.: US 10,244,062 B2
(45) Date of Patent: *Mar. 26, 2019

(54) UPDATING TIME-RELATED INFORMATION IN POST TO MAKE IT MORE RELEVANT FOR THE REQUESTER ON SUBSEQUENT RETRIEVAL OF POST

(71) Applicant: International Business Machines Corporation, Armonk, NY (US)

(72) Inventors: David A. Brooks, Arlington, MA (US); Jeffrey N. Eisen, Newton, MA (US); Scott H. Prager, Stratham, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/897,740

(22) Filed: Feb. 15, 2018

(65) Prior Publication Data

US 2018/0176316 A1    Jun. 21, 2018

Related U.S. Application Data

(63) Continuation of application No. 13/969,714, filed on Aug. 19, 2013, now Pat. No. 9,986,050.

(51) Int. Cl.
*G06F 17/30* (2006.01)
*H04L 29/08* (2006.01)
*H04L 12/58* (2006.01)

(52) U.S. Cl.
CPC .......... *H04L 67/22* (2013.01); *G06F 17/3089* (2013.01); *H04L 51/26* (2013.01);
(Continued)

(58) Field of Classification Search
CPC .......... G06F 17/30731; G06F 17/30734; G06F 17/3089
(Continued)

(56) References Cited

U.S. PATENT DOCUMENTS 5,790,974 A    8/1998 Tognazzini
7,069,003 B2   6/2006 Lehikoinen et al.
(Continued)

OTHER PUBLICATIONS

Office Action for U.S. Appl. No. 15/897,572 dated Jul. 30, 2018, pp. 1-14.

*Primary Examiner* — James Trujillo
*Assistant Examiner* — Fariborz Khoshnoodi
(74) *Attorney, Agent, or Firm* — Robert A. Voigt, Jr.; Winstead, P.C.

(57) ABSTRACT

A method, system and computer program product for updating the time-related information in a post to make it more relevant for the requester on a subsequent retrieval of the post. A post with a reference to an event or activity (e.g., "leaving for Florida in 3 days") is identified using natural language processing. Upon receiving a request from a requester to retrieve the post prior to the expiration of the event/activity, the post is updated by substituting a time countdown in the post with an up-to-date time countdown or with a current status of the referenced event/activity. If, however, the request is received after the expiration of the event/activity, then the post is removed or updated with an indication that the referenced event/activity has expired. In this manner, the requester will be receiving more accurate and relevant time-related information concerning the event or activity referenced in the post.

20 Claims, 4 Drawing Sheets

(52) U.S. Cl.
CPC ........ *H04L 51/32* (2013.01); *G06F 17/30731* (2013.01); *G06F 17/30734* (2013.01)

(58) Field of Classification Search
USPC .................................................. 707/769, 770
See application file for complete search history.

(56) References Cited

U.S. PATENT DOCUMENTS

| | | | |
|---|---|---|---|
| 7,082,402 | B2 | 7/2006 | Conmy et al. |
| 7,814,405 | B2 | 10/2010 | Kumar et al. |
| 8,560,013 | B2 * | 10/2013 | Jotanovic ................ H04W 4/21 455/557 |
| 2003/0227386 | A1 | 12/2003 | Pulkkinen et al. |
| 2007/0106627 | A1 * | 5/2007 | Srivastava ............. G06Q 10/10 706/20 |
| 2008/0091786 | A1 * | 4/2008 | Jhanji ................ G06Q 30/0259 709/206 |
| 2009/0164569 | A1 | 6/2009 | Garcia et al. |
| 2009/0282087 | A1 | 11/2009 | Muller et al. |
| 2010/0036924 | A1 * | 2/2010 | Naamani ............. G06Q 10/109 709/206 |
| 2012/0054115 | A1 | 3/2012 | Baird-Smith et al. |
| 2012/0297312 | A1 | 11/2012 | Lance et al. |
| 2014/0129324 | A1 | 5/2014 | Spivack et al. |

\* cited by examiner

UPDATING TIME-RELATED INFORMATION IN POST TO MAKE IT MORE RELEVANT FOR THE REQUESTER ON SUBSEQUENT RETRIEVAL OF POST

TECHNICAL FIELD

The present invention relates generally to social network services, and more particularly to updating the time-related information (e.g., updating the time to the occurrence of an event or activity) in a post (e.g., status update, microblog, text-based message) to make it more relevant for the requester on a subsequent retrieval of the post.

BACKGROUND

A social network service is an online service, platform or site that focuses on building and reflecting of social networks or social relations among people (e.g., those who share interests and/or activities). A social network service essentially consists of a representation of each user (often a profile), his/her social links, and a variety of additional services. Most social network services are web based and provide means for users to interact over the Internet, such as by e-mail and instant messaging. Social networking sites allow users to share ideas, activities, events, and interests within their individual networks.

Social networking sites (e.g., Facebook®) present to a particular user the posts by other users in a social networking feed often referred to as an "activity stream." "Posts" can include text (e.g., comments, sub-comments and replies), audio, video images, etc. Often, these posts include a timeframe for the occurrence or completion of an event or activity. For example, the post of "traveling to Boston on Tuesday" indicates that the poster will be traveling to Boston on Tuesday. In another example, the post of "going to lunch—back in 30 minutes" indicates that the poster will be back from lunch in 30 minutes from the time of the posting of the post. In a further example, the post of "graduating in 3 days" indicates that the poster will be graduating in three days from the time of the posting of the post.

Currently, social networking sites do not update the status or timeframe for the occurrence or completion of these events or activities. Hence, when a requester requests the retrieval of a user's profile or user's activity stream that includes the post with time-related information, the post will continue to include the time information that the poster originally posted even though such information is outdated. For example, suppose that a requester is a follower of the poster who retrieves their activity stream that includes a post made yesterday that states that the poster will be "graduating in 3 days." However, since the post was made yesterday, the poster will not be graduating in three days but in two days.

As a result, posts with time-related information that are later retrieved by other users will not include up-to-date timing or status information for the occurrence or completion of an event or activity mentioned in the post that would make the post more accurate and relevant for the requester.

SUMMARY

In one embodiment of the present invention, a method for updating a post with time-related information to make it more relevant to a requester on subsequent retrieval of the post comprises identifying a post with a reference to an event or activity using natural language processing. The method further comprises extracting a time countdown from the identified post and/or extracting metadata associated with the referenced event or activity, where the metadata comprises an end time of the referenced event or activity. The method additionally comprises identifying a current time in response to a request to retrieve the post from the requester. Furthermore, the method comprises determining if the time countdown or the end time of the referenced event or activity has expired based on the identified current time. Additionally, the method comprises updating, by a processor, the post by substituting the extracted time countdown with an up-to-date time countdown or updating the post with a current status of the referenced event or activity in response to the time countdown or the end time of the referenced event or activity not having been expired. In addition, the method comprises providing the updated post to the requester.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
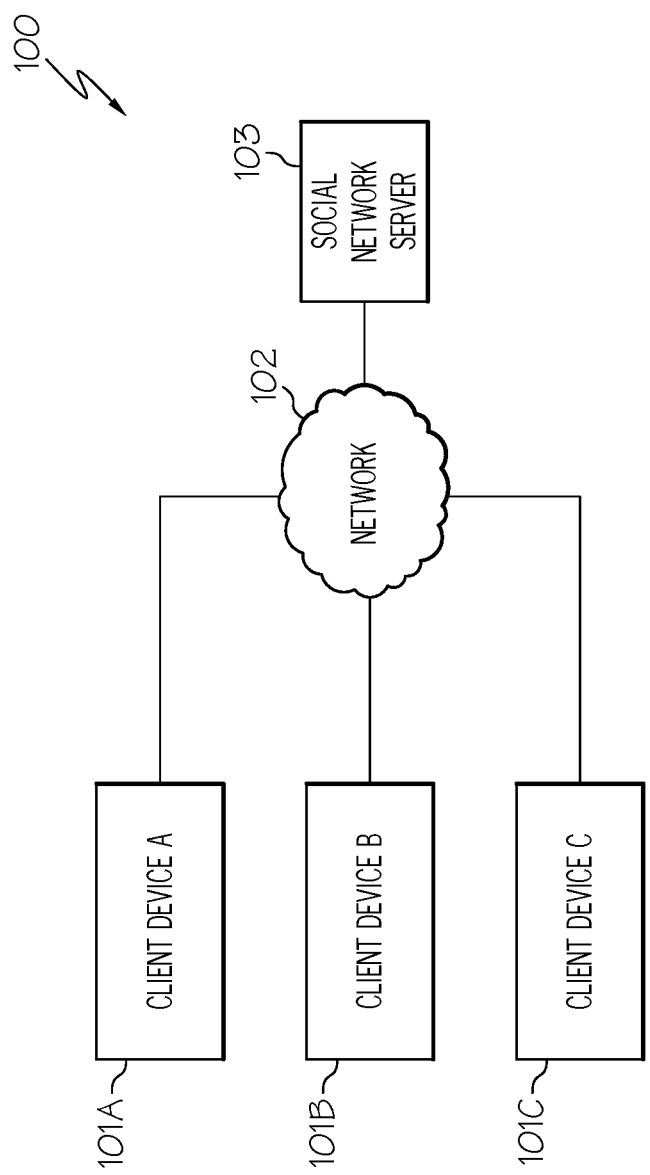
FIG. 1 illustrates a social network system configured in accordance with an embodiment of the present invention.

The present invention comprises a method, system and computer program product for updating the time-related information in a post to make it more relevant for the requester on a subsequent retrieval of the post. In one embodiment of the present invention, a post with a reference to an event or activity (e.g., "leaving for Florida in 3 days") is identified using natural language processing. The time that the post was initially posted, an identification of the referenced event or activity (e.g., "leaving for Florida") as well as a time countdown (if included in the post) (e.g., "3 days") is extracted from the post. Furthermore, metadata associated with the referenced event or activity (e.g., start time, end time, an identifier (e.g., Uniform Resource Locator (URL)), and a description (e.g., title)) is extracted if such information is available. The post and the extracted information are stored. Upon receiving a request from a requester to retrieve the post, the stored post is updated by substituting the extracted time countdown with an up-to-date time countdown (e.g., initial post of "leaving for Florida in 3 days" may be updated with the post of "leaving for Florida in 2 days" to reflect the fact that a day has transpired since the initial posting of the post) or updating the stored post with a current status of the referenced event or activity (e.g., initial post of "getting ready for sales meeting in 2 hours" may be updated with the post of "in sales meeting" to reflect the fact that more than two hours has transpired since the initial posting of the post but the end time of the meeting has not yet been reached) if the time countdown or the end time of the referenced event or activity has not expired. If, however, the time countdown or the end time of the referenced event or activity has expired, then the post is removed, such as from the user's profile page or from the user's activity stream, or updated with an indication that the time countdown has expired or that the end time of the referenced event or activity has expired (e.g., initial post of "leaving for Florida in 3 days" may be updated with the post of "left for Florida" to reflect the fact that more than three days has transpired since the initial posting of the post) based on the procedures for handling posts when the time countdown expires or when the referenced event or activity expires. In this manner, the requester will be receiving more accurate and relevant time-related information concerning the event or activity referenced in the post.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a social network system 100 configured in accordance with an embodiment of the present invention. Referring to FIG. 1, social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include a status update, microblog or text-based message that includes any one or more of the following: text (e.g., comments, sub-comments and replies), audio, video images, etc. A user of client device 101 that posts or sends a post is said to be a "poster." A user of client device 101 that requests to retrieve a post issued by the poster is said to be a "requester." Social network server 103 is connected to network 102 by wire or wirelessly. While FIG. 1 illustrates a single social network server 103, it is noted for clarity that multiple servers may be used to implement the social networking and/or microblogging service. A description of the hardware configuration of social network server 103 is provided below in connection with FIG. 2.

System 100 is not to be limited in scope to any one particular network architecture. System 100 may include any number of client devices 101, networks 102 and social network servers 103.

Figure 2:
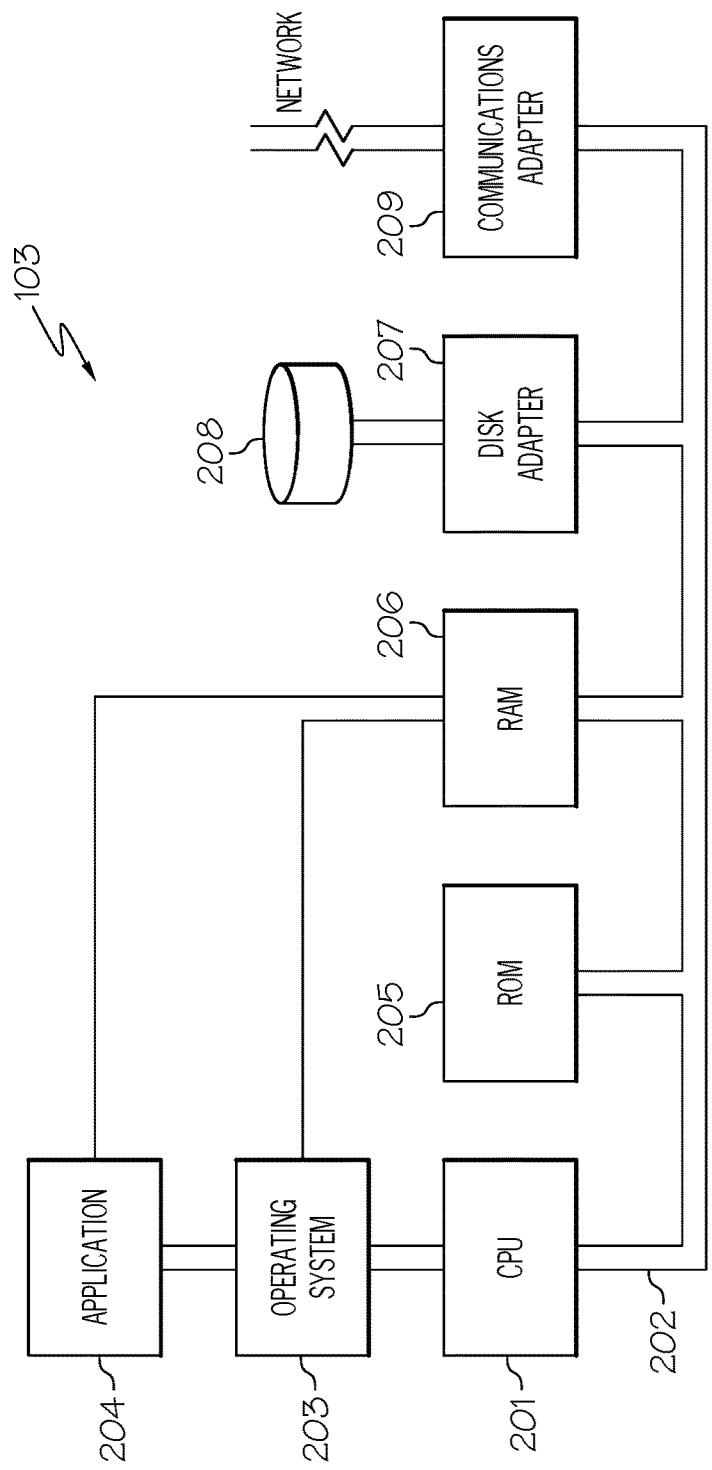
FIG. 2 illustrates a hardware configuration of a social network server configured in accordance with an embodiment of the present invention.

Referring now to FIG. 2, FIG. 2 illustrates a hardware configuration of social network server 103 (FIG. 1) which is representative of a hardware environment for practicing the present invention. Referring to FIG. 2, social network server 103 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for updating the time-related information (e.g., updating the time to the occurrence of an event or activity) in a post (e.g., status update, microblog, text-based message) to make it more relevant for the requester on a subsequent retrieval of the post, as discussed further below in association with FIGS. 3A-3B.

Referring again to FIG. 2, read-only memory ("ROM") 205 is coupled to system bus 202 and includes a basic input/output system ("BIOS") that controls certain basic functions of social network server 103. Random access memory ("RAM") 206 and disk adapter 207 are also coupled to system bus 202. It should be noted that software components including operating system 203 and application 204 may be loaded into RAM 206, which may be social network server's 103 main memory for execution. Disk adapter 207 may be an integrated drive electronics ("IDE") adapter that communicates with a disk unit 208, e.g., disk drive. It is noted that the program for updating the time-related information in a post to make it more relevant for the requester on a subsequent retrieval of the post, as discussed further below in association with FIGS. 3A-3B, may reside in disk unit 208 or in application 204.

Social network server 103 may further include a communications adapter 209 coupled to bus 202. Communications adapter 209 interconnects bus 202 with an outside network (e.g., network 102 of FIG. 1) thereby allowing social network server 103 to communicate with client devices 101.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, social networking sites (e.g., Facebook®) present to a particular user the posts by other users in a social networking feed often referred to as an "activity stream." "Posts" can include text (e.g., comments, sub-comments and replies), audio, video images, etc. Often, these posts include a timeframe for the occurrence or completion of an event or activity. For example, the post of "traveling to Boston on Tuesday" indicates that the poster will be traveling to Boston on Tuesday. In another example, the post of "going to lunch—back in 30 minutes" indicates that the poster will be back from lunch in 30 minutes from the time of the posting of the post. In a further example, the post of "graduating in 3 days" indicates that the poster will be graduating in three days from the time of the posting of the post. Currently, social networking sites do not update the status or timeframe for the occurrence or completion of these events or activities. Hence, when a requester requests the retrieval of a user's profile or user's activity stream that includes the post with time-related information, the post will continue to include the time information that the poster originally posted even though such information is outdated. For example, suppose that a requester is a follower of the poster who retrieves their activity stream that includes a post made yesterday that states that the poster will be "graduating in 3 days." However, since the post was made yesterday, the poster will not be graduating in three days but in two days. As a result, posts with time-related information that are later retrieved by other users will not include up-to-date timing or status information for the occurrence or completion of an event or activity mentioned in the post that would make the post more accurate and relevant for the requester.

The principles of the present invention provide a means for updating the time-related information (e.g., updating the time to the occurrence of an event or activity) in a post (e.g., status update, microblog, text-based message) to make it more relevant for the requester on a subsequent retrieval of the post as discussed further below in association with FIGS. 3A-3B.

Figure 3A:
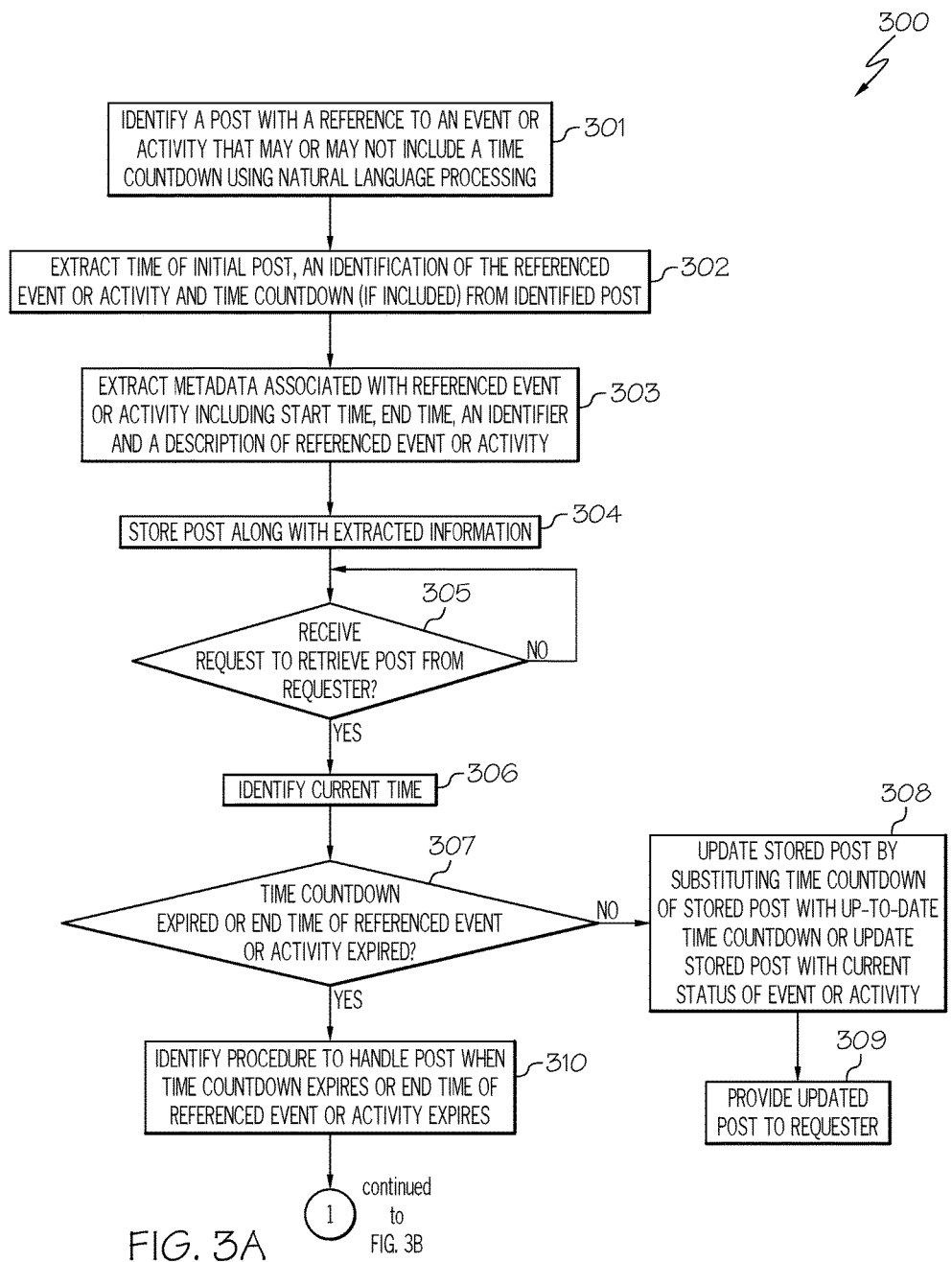
FIGS. 3A-3B are a flowchart of a method for updating a post with time-related information to make it more relevant to a requester on subsequent retrieval of the post in accordance with an embodiment of the present invention.
Figure 3B:
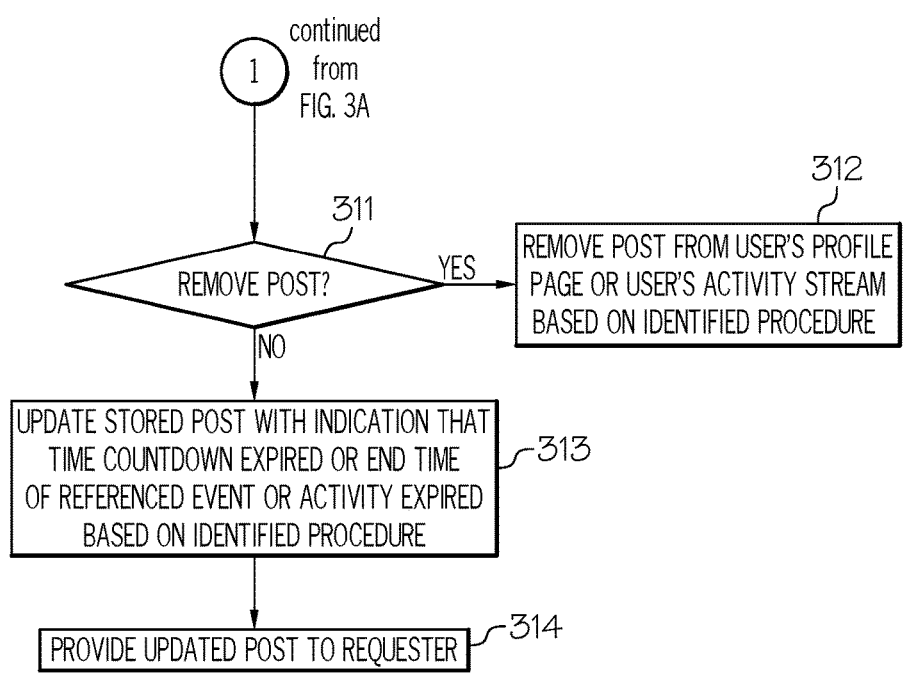

FIGS. 3A-3B are a flowchart of a method 300 for updating a post with time-related information to make it more relevant for a requester on subsequent retrieval of the post in accordance with an embodiment of the present invention. "Time-related" information, as used herein, refers to a duration of time for an event or activity to occur or be completed, including, but not limited to, a time countdown. A "time countdown," as used herein, refers to a duration of time (e.g., three days) specified in the post for an event or activity to occur or be completed.

Referring now to FIG. 3A, in conjunction with FIGS. 1-2, in step 301, social network server 103 identifies a post that includes a reference to an event or activity, where the post may or may not include a specific time countdown, using natural language processing. Examples of posts that include a time countdown, include, but not limited to, "leaving for Florida in 3 days" or "3 days until graduation." A set of patterns representing time countdowns may be identified in the posts using natural language processing, such as the patterns of "in <x> <units>" or "<x> <units> until," where <x> is a value, such as a positive number. Examples of posts that reference an event or activity without including a time countdown, include, but not limited to, "getting ready for team meeting," and "listening to a sales presentation." While such references may not include a specific time countdown, such events or activities may be scheduled in the poster's calendar. As a result, as will be discussed further below, social network server 103 may be able to obtain time-related information associated with these references to events or activities that do not include a specific time countdown by linking through analytics to the poster's calendar to extract time-related information, such as the start time, the end time, an identifier (e.g., Uniform Resource Locator (URL)), and a description (e.g., title) of the referenced event or activity. A set of patterns representing references to events or activities that do not include a specific time countdown may be identified in the posts using natural language processing, such as the patterns of "listening to <event>," "preparing for <event>," or "meeting with <person>."

In step 302, social network server 103 extracts the time that the post (post identified in step 301) was initially posted, an identification of the referenced event or activity (e.g., the term "meeting" in the post, the action "leaving for" in the post) as well as a time countdown (if included) from the posted identified in step 301. For example, in the post "leaving for Florida in 3 days," social network server 103 may extract the time that the post "leaving for Florida in 3 days" was initially posted by the poster. Social network server 103 may also extract the identification of the event/activity (e.g., "leaving for Florida") and the time countdown (e.g., "3 days") from the post.

In step 303, social network server 103 extracts metadata associated with the referenced event or activity, such as the start time, the end time, an identifier (e.g., Uniform Resource Locator (URL)), and a description (e.g., title) of the referenced event or activity if such information is available to be extracted. As discussed above, such metadata may be extracted from the poster's calendar entry associated with the referenced event or activity.

In step 304, social network server 103 stores the post along with the extracted information (e.g., information extracted in steps 302 and 303), such as in disk unit 208.

In step 305, a determination is made by social network server 103 as to whether it received a request to retrieve the post (post identified in step 301 and stored in step 304) from a requester. For example, the requester may request retrieval of the post via a request for retrieving the user's profile page containing the post or via a request for retrieving the user's activity stream containing the post.

If social network server 103 has not received a request to retrieve the post, then social network server 103 continues to determine whether it received a request to retrieve the post in step 305.

If, however, social network server 103 receives a request to retrieve the post, then, in step 306, social network server 103 identifies the current time.

In step 307, a determination is made by social network server 103 as whether the time countdown expired or the end time of the referenced event or activity has expired in light of the current time. For example, if the user posted a post that indicated that the user was "leaving for Florida in 2 hours" and more than two hours has transpired since the initial posting of the post, then the time countdown of "2 hours" has elapsed or expired. In another example, if a user posted a post that indicated that the user was "getting ready for the meeting" and the user's calendar indicates that the meeting is from 1:00-2:00 pm, then the end time of the referenced event or activity has expired if the current time is past 2:00 pm.

If the time countdown or the end time of the referenced event or activity has not expired, then, in step 308, social network server 103 updates the stored post by substituting the time countdown of the stored post with an up-to-date time countdown or updates the stored post with a current status of the event or activity. For example, the poster's initial post of "leaving for Florida in 3 days" may be updated with the post of "leaving for Florida in 2 days" to reflect the fact that a day has transpired since the initial posting of the post. In another example, the poster's initial post of "getting ready for sales meeting in 2 hours" may be updated with the post of "getting ready for sales meeting in 1 hour" to reflect the fact that an hour has transpired since the initial posting of the post. In a further example, the poster's initial post of "getting ready for sales meeting in 2 hours" may be updated with the post of "in sales meeting" to reflect the fact that more than two hours has transpired since the initial posting of the post but the end time of the meeting has not yet been reached (i.e., expired). In this manner, the requester will be receiving more accurate and relevant time-related information concerning the event or activity referenced in the post.

In step 309, social network server 103 provides the updated post to the requester. In one embodiment, the requester (user of client device 101) may additionally receive the extracted time-related information (e.g., time countdown, end time for the completion of the event or activity) thereby allowing the requester to dynamically update the post with the current time-related information without retrieving the post from social network server 103.

Client device 101 has a hardware configuration similar to social network server 103 as shown in FIG. 2 (may further include various input/output devices, such as a keyboard, mouse, display and keyboard), such as a memory for storing an application for performing such updates as well as a processor for executing the instructions of the application. The aspects of the present invention in such an embodiment may be embodied as a system, method or computer program product as discussed herein.

If, however, the time countdown or the end time of the referenced event or activity has expired, then, in step 310, social network server 103 identifies the procedure to handle the post when the time countdown expires or when the referenced event or activity expires. Various procedures may be used to handle the situation when the time countdown has expired or when the end time of the event or activity has transpired (i.e., expired), such as removing the post from the user's profile page or from the user's activity stream or updating the post to indicate that the time countdown has expired or that the end time of the event or activity has expired (i.e., the event or activity has already occurred). Such handling procedures may be established or overridden (in the case of default procedures) by the user (i.e., the poster).

Referring now to FIG. 3B, in conjunction with FIGS. 1-2, in step 311, a determination is made by social network server 103 as to whether the post is to be removed, such as removed from the user's profile page or from the user's activity stream.

If the post is to be removed, then, in step 312, social network server 103 removes the post, such as from the user's profile page or from the user's activity stream.

If, however, the post is not to be removed, then, in step 313, social network server 103 updates the stored post with an indication that the time countdown has expired or that the end time of the referenced event or activity has expired. For example, the poster's initial post of "leaving for Florida in 3 days" may be updated with the post of "left for Florida" to reflect the fact that more than three days has transpired since the initial posting of the post. In another example, the poster's initial post of "getting ready for sales meeting in 2 hours" may be updated with the post of "done with sales meeting" to reflect the fact that the end time of the meeting has been reached (i.e., expired). In this manner, the requester will be receiving more accurate and relevant time-related information concerning the event or activity referenced in the post.

In step 314, social network server 103 provides the updated post to the requester.

In some implementations, method 300 may include other and/or additional steps that, for clarity, are not depicted. Further, in some implementations, method 300 may be executed in a different order presented and that the order presented in the discussion of FIGS. 3A-3B is illustrative. Additionally, in some implementations, certain steps in method 300 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for updating a post with time-related information to make it more relevant to a requester on subsequent retrieval of the post, the computer program product comprising a computer readable storage medium having program code embodied therewith, the program code comprising the programming instructions for:
    identifying a post with a reference to an event or activity using natural language processing;
    extracting a time countdown from said identified post and/or extracting metadata associated with said referenced event or activity, wherein said metadata comprises an end time of said referenced event or activity;
    identifying a current time in response to a request to retrieve said post from said requester;
    determining if said time countdown or said end time of said referenced event or activity has expired based on said identified current time;
    updating said post by substituting said extracted time countdown with an up-to-date time countdown or updating said post with a current status of said referenced event or activity in response to said time countdown or said end time of said referenced event or activity not having been expired; and
    providing said updated post to said requester.

2. The computer program product as recited in claim 1, wherein said metadata further comprises one or more of the following: a start time, an identifier and a description of said referenced event or activity.

3. The computer program product as recited in claim 2, wherein said metadata is extracted from a calendar entry associated with said referenced event or activity.

4. The computer program product as recited in claim 1, wherein said retrieval of said post is in connection with a retrieval of a user's profile page containing said post.

5. The computer program product as recited in claim 1, wherein said retrieval of said post is in connection with a retrieval of a user's activity stream containing said post.

6. The computer program product as recited in claim 1, wherein the program code further comprises the programming instructions for:
    identifying a procedure to handle said post in response to said time countdown expiring or in response to said end time of said referenced event or activity expiring.

7. The computer program product as recited in claim 6, wherein the program code further comprises the programming instructions for:
    removing said post from a user's profile page or from a user's activity stream based on said identified procedure.

8. The computer program product as recited in claim 6, wherein the program code further comprises the programming instructions for:
    updating said post with an indication that said time countdown expired or said end time of said referenced event or activity expired based on said identified procedure.

9. The computer program product as recited in claim 1, wherein the program code further comprises the programming instructions for:
    extracting an identification of said referenced event or activity from said identified post.

10. The computer program product as recited in claim 9, wherein the program code further comprises the programming instructions for:

storing said post, said extracted identification of said referenced event or activity as well as said extracted time countdown and/or said extracted metadata associated with said referenced event or activity.

11. A system, comprising:

a memory unit for storing a computer program for updating a post with time-related information to make it more relevant to a requester on subsequent retrieval of the post; and a processor coupled to the memory unit, wherein the processor is configured to execute the program instructions of the computer program comprising:

identifying a post with a reference to an event or activity using natural language processing;

extracting a time countdown from said identified post and/or extracting metadata associated with said referenced event or activity, wherein said metadata comprises an end time of said referenced event or activity;

identifying a current time in response to a request to retrieve said post from said requester;

determining if said time countdown or said end time of said referenced event or activity has expired based on said identified current time;

updating said post by substituting said extracted time countdown with an up-to-date time countdown or updating said post with a current status of said referenced event or activity in response to said time countdown or said end time of said referenced event or activity not having been expired; and providing said updated post to said requester.

12. The system as recited in claim 11, wherein said metadata further comprises one or more of the following: a start time, an identifier and a description of said referenced event or activity.

13. The system as recited in claim 12, wherein said metadata is extracted from a calendar entry associated with said referenced event or activity.

14. The system as recited in claim 11, wherein said retrieval of said post is in connection with a retrieval of a user's profile page containing said post.

15. The system as recited in claim 11, wherein said retrieval of said post is in connection with a retrieval of a user's activity stream containing said post.

16. The system as recited in claim 11, wherein the program instructions of the computer program further comprise:

identifying a procedure to handle said post in response to said time countdown expiring or in response to said end time of said referenced event or activity expiring.

17. The system as recited in claim 16, wherein the program instructions of the computer program further comprise:

removing said post from a user's profile page or from a user's activity stream based on said identified procedure.

18. The system as recited in claim 16, wherein the program instructions of the computer program further comprise:

updating said post with an indication that said time countdown expired or said end time of said referenced event or activity expired based on said identified procedure.

19. The system as recited in claim 11, wherein the program instructions of the computer program further comprise:

extracting an identification of said referenced event or activity from said identified post.

20. The system as recited in claim 19, wherein the program instructions of the computer program further comprise:

storing said post, said extracted identification of said referenced event or activity as well as said extracted time countdown and/or said extracted metadata associated with said referenced event or activity.

* * * * *